April 5, 1960     H. W. SIGWORTH     2,931,189

HEAT PUMP AND HEAT ENGINE

Filed Dec. 3, 1956     6 Sheets-Sheet 1

INVENTOR.
HARRISON W. SIGWORTH
BY Edward B. Fegg
ATTORNEY

April 5, 1960

H. W. SIGWORTH 2,931,189

HEAT PUMP AND HEAT ENGINE

Filed Dec. 3, 1956

INVENTOR.
HARRISON W. SIGWORTH
BY
Edward P. Fry
ATTORNEY

April 5, 1960 H. W. SIGWORTH 2,931,189
HEAT PUMP AND HEAT ENGINE
Filed Dec. 3, 1956 6 Sheets-Sheet 3

INVENTOR.
HARRISON W. SIGWORTH
BY
ATTORNEY

April 5, 1960  H. W. SIGWORTH  2,931,189
HEAT PUMP AND HEAT ENGINE
Filed Dec. 3, 1956  6 Sheets-Sheet 4

INVENTOR.
HARRISON W. SIGWORTH
BY
ATTORNEY

April 5, 1960      H. W. SIGWORTH      2,931,189
HEAT PUMP AND HEAT ENGINE

Filed Dec. 3, 1956      6 Sheets-Sheet 5

INVENTOR.
HARRISON W. SIGWORTH
BY Edward B. Fry
ATTORNEY

April 5, 1960 H. W. SIGWORTH 2,931,189
HEAT PUMP AND HEAT ENGINE

Filed Dec. 3, 1956 6 Sheets-Sheet 6

INVENTOR.
HARRISON W. SIGWORTH
BY
Edward B. Fegg
ATTORNEY

United States Patent Office 2,931,189
Patented Apr. 5, 1960

2,931,189

HEAT PUMP AND HEAT ENGINE

Harrison W. Sigworth, El Cerrito, Calif.

Application December 3, 1956, Serial No. 625,864

7 Claims. (Cl. 62—6)

This invention relates to a heat pump. The device of the invention may also be used as a heat engine, to convert thermal energy into mechanical energy. For convenience, however, the device will be referred to primarily as a heat pump.

Heat pumps have been provided heretofore which rely upon expansion and compression of a gas and which utilize the fact that, when a gas is compressed adiabatically its temperature rises, and when it is expanded adiabatically its temperature diminishes. Heat pumps employing this phenomenon cause a fluid to absorb heat from the compressed gas and another fluid to give up heat to the expanded gas.

A typical example of such a heat pump is described in Myers U.S. Patent No. 1,469,729, granted October 2, 1923, entitled "Method and Machine for Refrigeration."

In the Myers patent bellows members are provided which are filled with a gas and are connected to opposing rotatable plates. One of the plates is located in a vertical plane and is positively driven. The other plate is located in an inclined plane and is free to rotate on a stub shaft. The inclination of the latter plate determines the degree of compression and expansion of the gas.

Prior heat pumps have certain disadvantages for purposes of the present invention, which is an efficient heat pump having features of flexibility as explained in detail hereinafter. Thus the degree of compression and expansion of prior heat pumps, such as the Myers device, is not easily adjustable. Also in the Myers device the flexible bellows members serve as the driving connection between the two plates. Also, the said device is capable only of refrigerating a liquid and expelling warm gas. It is not, for example, adapted to heat a liquid and expel a cool gas.

It is an object of the present invention to provide a heat pump employing the principle of heat generation by compression of a gas and heat absorption by expansion of a gas, such heat pump being of an improved design as compared with previous pumps of generally similar type.

It is a further and particular object of the invention to provide a heat pump of the general character described which, however, is more flexible; e.g., one which is adjustable with respect to the degree of expansion and compression of a gas and which is convertible at will to purposes of heating or cooling.

It is another object of the invention to provide means whereby air can be employed as the circulating medium and can be heated and/or cooled by a pump of this character.

Yet another object is to provide a heat pump of the general character described in which atmospheric air may be employed as the circulating medium. The air is heated and/or cooled as desired, and the pump is provided with housing and baffle means to increase the efficiency of the pump, e.g., to minimize mixing of hot and cold currents of air.

Yet another object of the invention is to provide a heat pump of the character described which is adapted for the purpose of heating and/or cooling a dwelling or other enclosed space.

These and other objects of the invention will be apparent from the ensuing description and the appended claims.

Certain forms of the invention are illustrated by way of example in the accompanying drawings in which, Figure 1 is a view in longitudinal section through a heat pump constructed in accordance with the invention, such view being a section along the line 1—1 of Figure 2.

Figure 1:
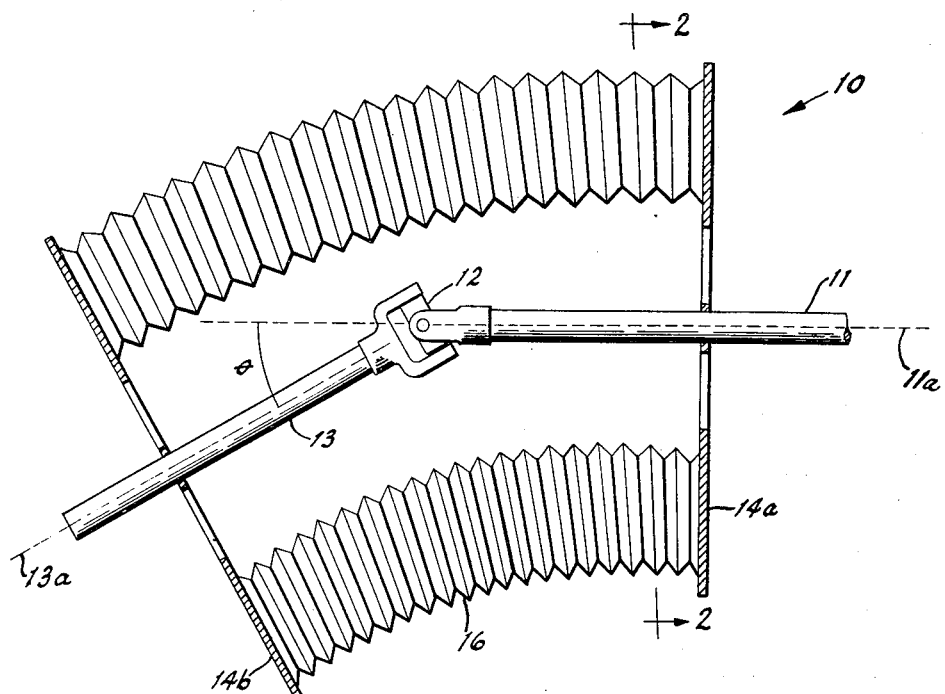
Figure 2:
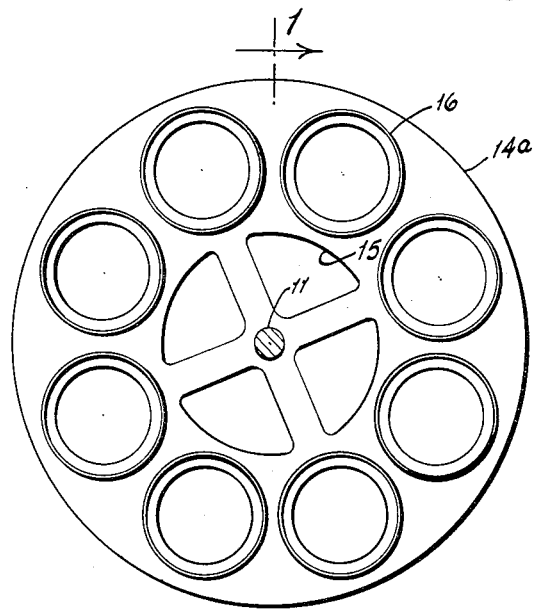
Figure 2 is a transverse section taken along the line 2—2 of Figure 1.

Referring now to Figures 1 and 2 and more particularly to Figure 1, a heat pump is there shown which embodies the basic principles of my invention, such heat pump being generally designated by the reference numeral 10. It comprises shaft 11 which is driven by any suitable means (not shown). The driving means may be an electric motor, a gasoline engine, the motor of an automobile or any other source of power. The shaft 11 is connected by a universal or Hook's joint 12 to a shaft 13. For convenience the shafts 11 and 13 will be referred to hereinafter as the "driving" shaft and the "driven" shaft, respectively. The driving shaft 11 is supported by any suitable journal or bearing means to rotate about a fixed axis indicated as 11a, whereas the driven shaft 13 is intended to be adjustable to rotate about a variable axis indicated as 13a, such axis being shiftable below and above the axis 11a by an angle θ. The magnitude of the angle θ will depend upon the particular design of the pump. It will be understood that the terms "above" and "below" are relative terms only which are used for convenience of description. As regards the basic device, it is not important whether the angle θ lies in a vertical, horizontal or inclined plane, but, as will be apparent hereinafter, in particular applications it may be preferred to locate the angle θ in a particular plane.

A flat plate 14a is fixed to and rotates with the driving shaft 11 and a similar flat plate 14b is fixed to and rotates with the driven shaft 13. Since the plates 14a and 14b are perpendicular to their respective shafts, it will be apparent that these plates are disposed at an angle θ. Each of the plates 14a and 14b is formed with inlet openings 15 and a plurality of bellows members 16 are provided each of which is attached at one end (to the right as viewed in Figure 1) to the plate 14a and at its other end to the plate 14b.

It will be apparent that, as the driving shaft 11 rotates the right-hand plate 14a will rotate with it and that, by reason of the universal joint 12, the driven shaft 13 will also rotate about its axis 13a thereby causing rotation of the left-hand plate 14b about the axis 13a. It will, therefore, be apparent that each of the bellows members 16 will expand during one-half of each revolution and will compress during the other half of each revolution and that a gas contained in such bellows member will expand (hence cool) during each ½ revolution and will compress (hence heat) during the other ½ revolution. Air is caused to circulate by any suitable means, certain of which are illustrated hereinafter with reference to other figures of the drawings, so that one current of air passes in contact with the bellows 16 during the expansion phase of their cycle and another current passes in contact with the bellows 16 during the compression phase of their cycle. It will, therefore, be apparent that two currents of air will flow from the pump, one of which is heated and the other of which is cooled.

Certain advantages of the heat pump illustrated in Figures 1 and 2 will be apparent upon a consideration of these figures. Thus, by adjusting the angle θ, i.e., making it smaller or larger, the degree of compression and expansion of the bellows members 16 is diminished or increased, respectively. Accordingly the two issuing currents of air are heated and cooled to a lesser degree or to a greater degree, respectively. Adjustment of the angle θ can be accomplished by shifting the shaft 13. It will also be apparent that by shifting the driven shaft 13 above the axis 11a, the pumping of heat will be reversed. That is, a warm current of air will flow from above the axis 11a and a cold current of air will flow from below such axis.

It will also be apparent that no torque is applied to the bellows elements 16, because the driving connection between the plates 14a and 14b is established by the universal joint 12 and not through the bellows members themselves. Hence the bellows 16 can be made of less rugged material and can be made to last much longer than in prior designs wherein the driving connection between the two shafts is established by the bellows members themselves.

Figure 3:
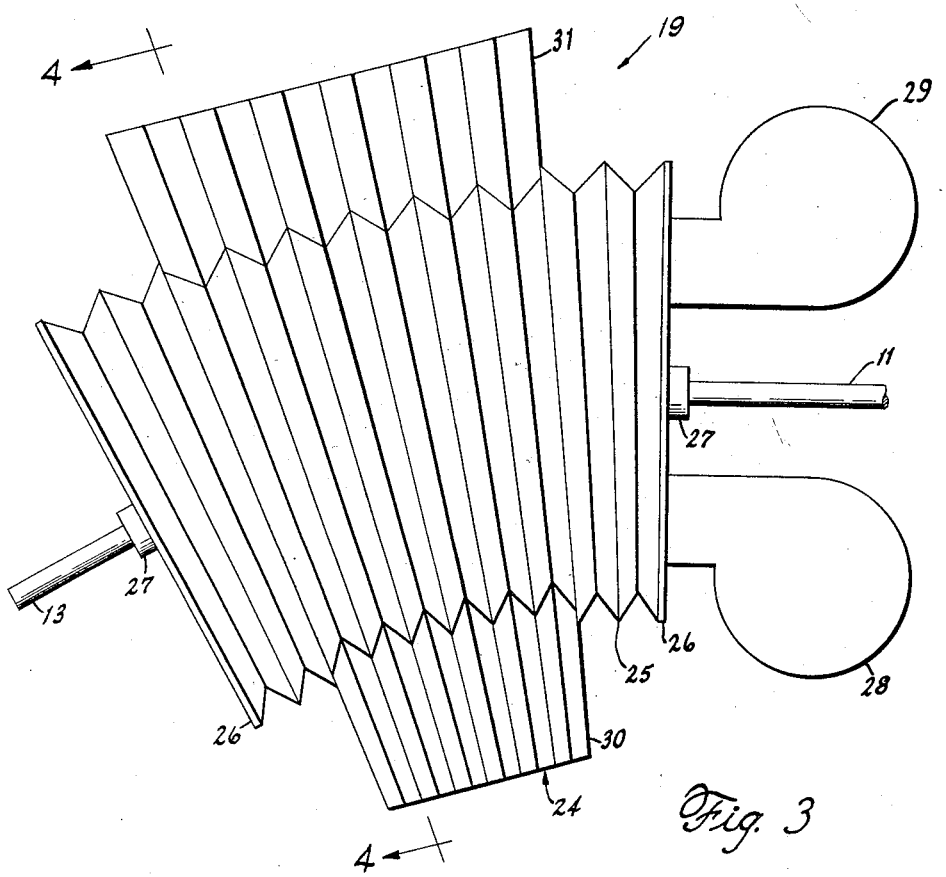
Figure 3 is a top plan view of a heat pump such as shown in Figures 1 and 2 but enclosed in a housing and provided with blowers.
Figure 4:
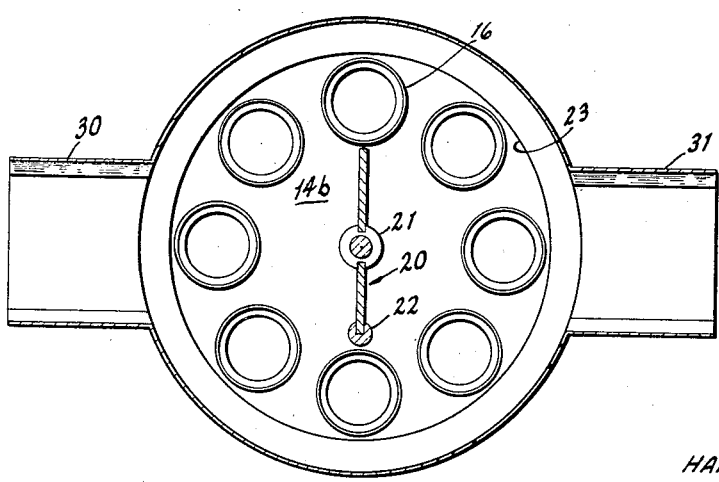
Figure 4 is a section taken along the line 4—4 of Figure 3 showing the baffle means employed to minimize mixing of the hot and cold currents of air.

Referring now to Figures 3 and 4 of the drawings, a blower type of apparatus is there shown which employs a heat pump such as that shown in Figures 1 and 2 but is equipped with a suitable housing, with baffle means to prevent mixing of the hot and cold currents of air and with blowers to create the required currents of air. The apparatus is generally indicated by the reference numeral 19. Referring more particularly to Figure 4, it will be seen that a baffle member 20 is provided in the form of a plate which is journaled at 21 on the shafts 11 and which has a weight at 22 to hold the baffle plate in vertical position to divide the chamber 23 into two parts. It will be understood that two such baffle members 20 are provided, one of which is journaled on the adjustable driver shaft 13, the other being journaled on the driving shaft 11. A housing is provided which is generally indicated by the reference numeral 24 and which comprises a body portion 25. The housing 24 is of expansible-collapsible type, for example, a bellows or accordion type construction. To opposite ends are fixed end plates 26, one of which is journaled at 27 on the shaft 11 and the other at 27 on the shaft 13. Blowers are provided at 28 and 29 on opposite sides of the shaft 11 and at the right-hand end of the device as viewed in Figure 3. The adjacent end plate 26 is provided with openings (not shown) to receive the discharge from the blowers 28 and 29. Outlet ducts or vents 30 and 31 are provided at opposite sides of the housing 24, such vents being also of expansible-collapsible, accordion type construction.

In operation the shaft 11 will be driven as described above in connection with Figures 1 and 2, thereby compressing each of the bellows members 16 during half a revolution and expanding it during the other half revolution. With the arrangement illustrated in Figures 3 and 4, expansion will occur on the right-hand side of the chamber 23 as viewed in Figure 4 and compression will occur on the left-hand side of the chamber. Meanwhile the blowers 28 and 29 will be operated to blow air into the right-hand and left-hand halves of the chamber 23. Mixing of the two streams of air will be reduced to a minimum degree by reason of the baffle member 20. As a result substantially all of the air blown into the left half of the chamber 23 by the blower 28 will discharge through the vent 30 substantially unmixed with air from the other blower 29. It will, therefore, be apparent that the air discharging through the vent 30 will be heated. It will be similarly apparent that air introduced into the right half of the chamber 23 by the blower 29 will be cooled and that a stream of cold air will issue from the vent 31.

Figure 5:
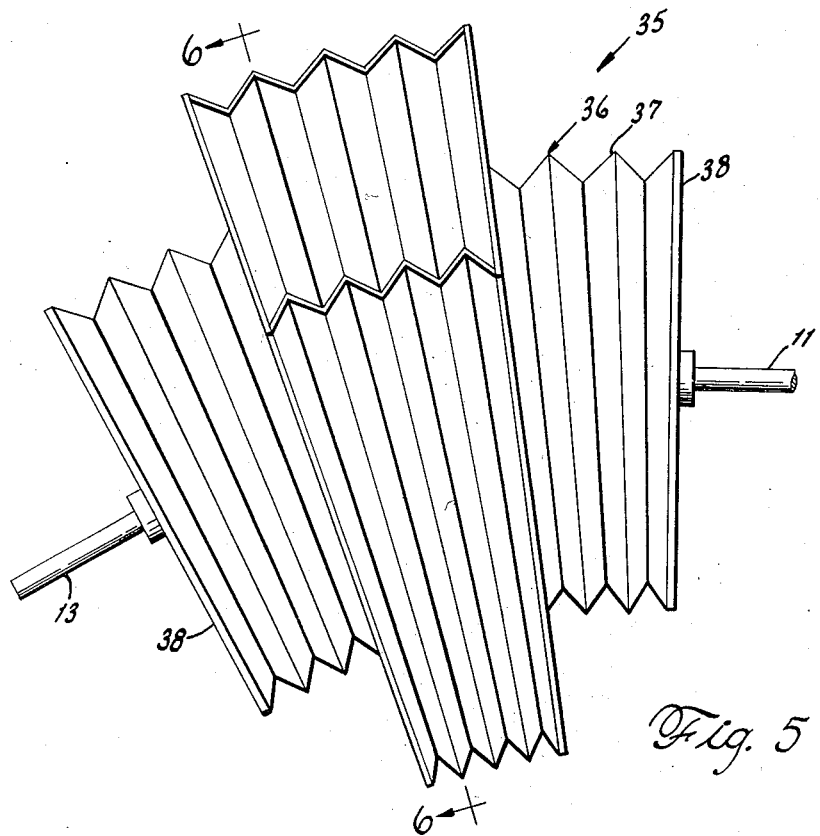
Figures 5 and 6 are views similar to Figures 3 and 4, respectively, but of a centrifugal rather than a blower type of apparatus.
Figure 6:
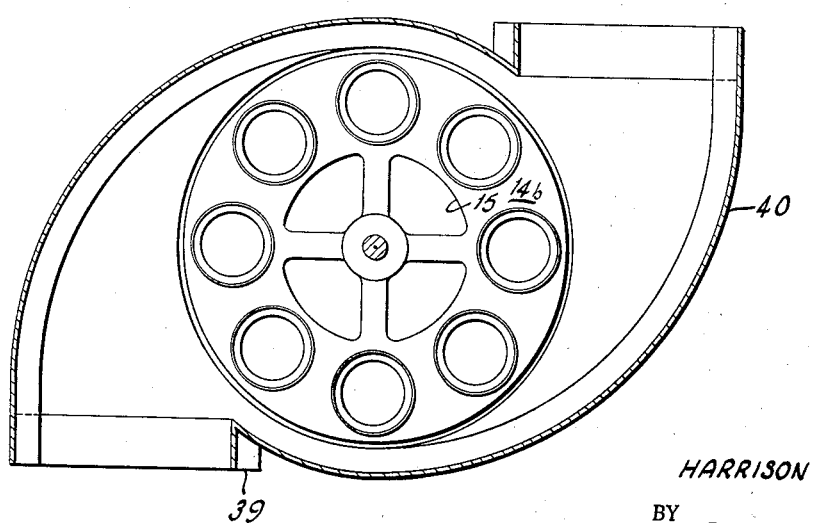

Referring now to Figures 5 and 6, a centrifugal type of apparatus is there illustrated which is generally designated by the reference numeral 35. It comprises a bellows or accordion type, expansible-collapsible housing 36 including a body portion 37 fixed to end plates 38 which are loose on the shafts 11 and 13. The housing 36 also is provided with tangential outlet ducts 39 and 40 for the left-hand and right-hand sides of the apparatus as viewed in Figure 6. Referring to Figure 6 it will be apparent that the left-hand end plate 14b is provided with openings 15. The adjacent end plate 38 is provided with corresponding openings.

In operation the shaft 11 is driven. The openings in the end plates 38, 14a and 14b act as air inlets and the bellows members 16 act in the same manner as the vanes or scoops of a centrifugal pump; they sweep in air from outside. Air picked up on the left-hand side of the apparatus (as viewed in Figure 6), will be discharged through the tangential vent 39 and air picked up on the right-hand side will be discharged through the tangential vent 40. It will be apparent that air discharged through the vent 39 will be heated by reason of its contact with the bellows members 16 during the compression stage of their cycle and that air discharged through the vent 40 will be cooled by reason of contact with the bellows members 16 during the expansion stage of their cycle.

Figure 7:
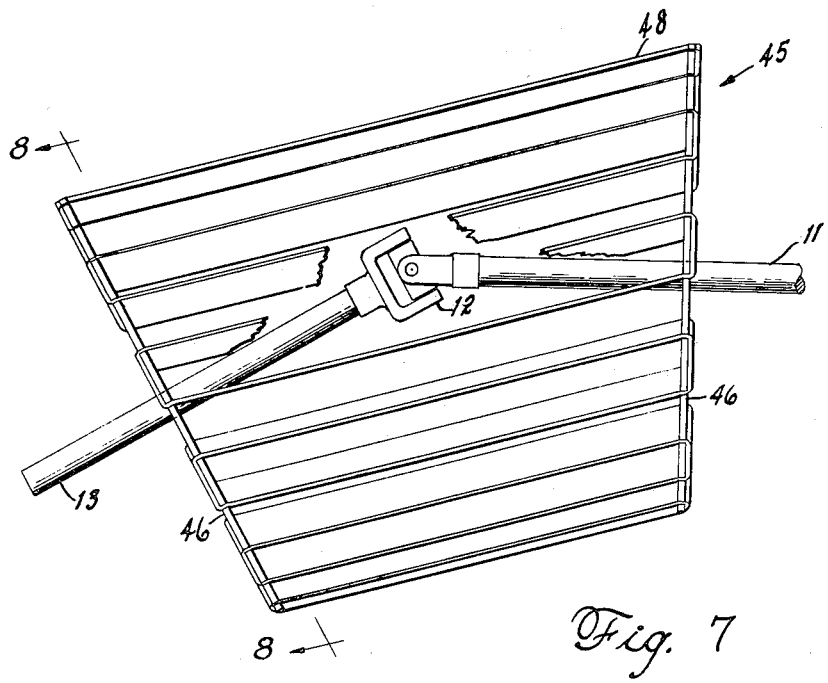
Figure 7 is a view in side elevation of another form of heat pump employing elastic bands rather than gas compression-expansion chambers.
Figure 8:
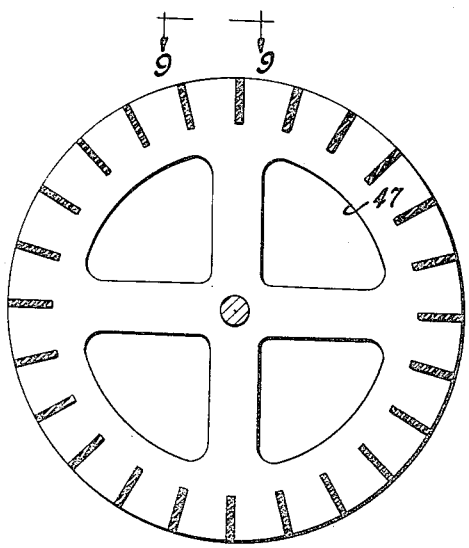
Figure 8 is an end view of the pump of Figure 7.
Figure 9:
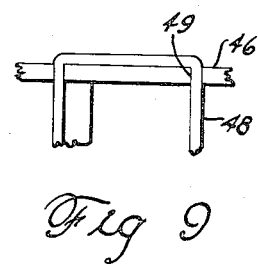
Figure 9 is a fragmentary view along the line 9—9 of Figure 8.

Referring now to Figures 7, 8 and 9, a different type of heat pump employing elastic bands rather than compression-expansion chambers is illustrated and is generally designated by the reference numeral 45. A driving shaft 11 and an adjustable driven shaft 13 interconnected by means of a universal joint 12 are provided as in the case of the heat pump shown in Figures 1 and 2. End plates 46 are also provided, one of which is fixed to the shaft 11 and the other to the shaft 13. Inlet openings are provided at 47. Instead of bellows members such as shown at 16 in Figures 1 and 2, elastic bands 48 are provided, each such band being held in place by engagement with slots 49 formed in the end plates 46.

As is well known, when an elastic band is stretched, a portion of the energy put into the band to stretch it appears as heat. Correspondingly, when a stretched band is relaxed the material of the band is cooled. It will, therefore, be apparent that a heat pump is provided which is generally similar to that of Figure 1 but is reversed in the sense that the stretching phase of the cycle (i.e., while the plates 46 are separating) produces heat and the relaxing phase of the cycle (while the plates 46 are approaching) absorbs heat.

Figure 10:
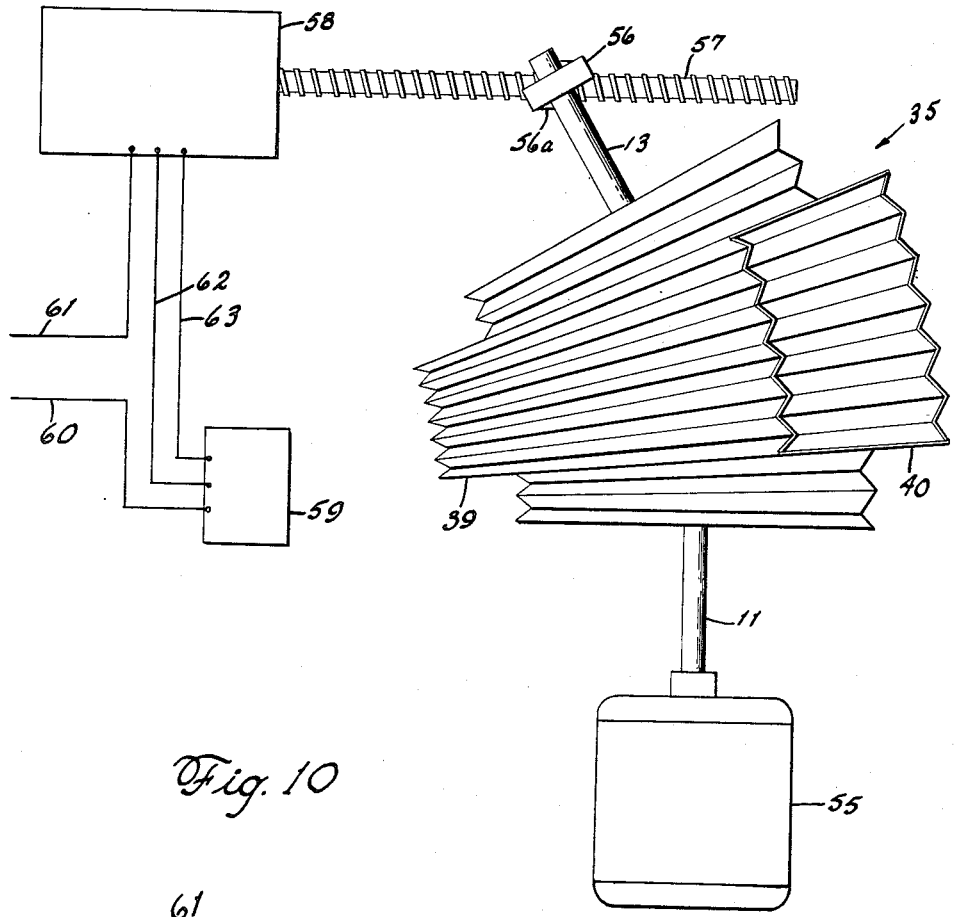
Figure 10 is a view showing an automatic control system in conjunction with a heat pump of the invention.

Referring now to Figure 10, a system is there shown for automatic operation of a heat pump, such heat pump being generally designated by the reference numeral 35 and being the same as that shown and similarly designated in Figure 5. However, a blower type of pump may be provided such as shown in Figure 3. The shaft 11 is driven by a motor 55 and the adjustable shaft 13 is journaled in a bearing 56 to which is fixed a nut 56a which is in threaded engagement with a lead screw 57. The latter is driven in either direction by a reversible motor 58. A thermostat is provided at 59 which senses the temperature of the ambient air. Power leads are shown at 60 and 61. The power lead 60 connects to the thermostat 59 and the power lead connects directly to the motor 58. Leads 62 and 63 connect the thermostat 59 with the motor 58.

In operation the motor 55 will be driven continuously. Assume that the thermostat is set to operate the motor 58 in one direction if the temperature drops below 70° F. and to operate the motor 58 in the opposite direction if the temperature rises above 70° F. It will be understood, of course, that there will be a small range of temperatures, e.g., 2–3 degrees, within which the thermostat 59 will not cause the motor 58 to operate at all, but, for convenience of description it is assumed that a fixed temperature, such as 70° F., is the temperature at which the motor 58 is deenergized. Assume further that the vent 39 delivers air to a system of ducts for the purpose of maintaining constant temperature (70° F.) in a room and that the vent 40 discharges to the atmosphere. If the temperature in the room should drop below 70° F. the thermostat 59 will energize the motor 58 and will cause it and the lead screw 57 to rotate in the proper direction as to move the nut 56a from right to left as viewed in Figure 10, thereby increasing the angle θ between the axes of shafts 11 and 13. The motor 58 will continue to operate and the angle θ will continue to increase, hence the degree of compression and heating of air vented at 39 will continue to increase, until the temperature in the room reaches the predetermined value of 70° F. The motor 58 will be deenergized and the nut 56a will remain in fixed position. It will also be apparent that if the temperature in the room rises above 70° F., the motor 58 will be operated in the reverse direction, thereby moving the nut 56a to the right and reducing the temperature of air discharged through the vent 39. Should the temperature continue to rise, for example, if the weather should become so warm that it tends to heat the room to a temperature above 70° F., the motor 58 will operate to move the nut 56a so far to the right that the pumping of heat will be reversed and air issuing from the vent 39 will be cooled.

Figure 11:
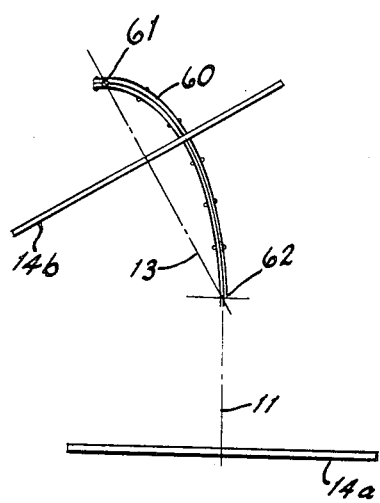
Figure 11 is a view showing the manner in which a bimetal element may be employed to adjust automatically the degree of compression and expansion of the pump of the invention.

A means is shown somewhat diagrammatically in Figure 11 which employs a bimetallic element 60 which is fixed at 61 to the adjustable shaft 13 and at 62 to a frame element of the apparatus. It will be assumed that the bimetallic element 60 is normally straight but bends to the left (as viewed in Figure 11) when it is cooled and to the right when it is heated below a predetermined temperature. It will be apparent that the bimetal element 60 will automatically and continuously adjust the angle θ between the axes 11a and 11b, thereby effecting an automatic, thermostatic control.

Figure 12:
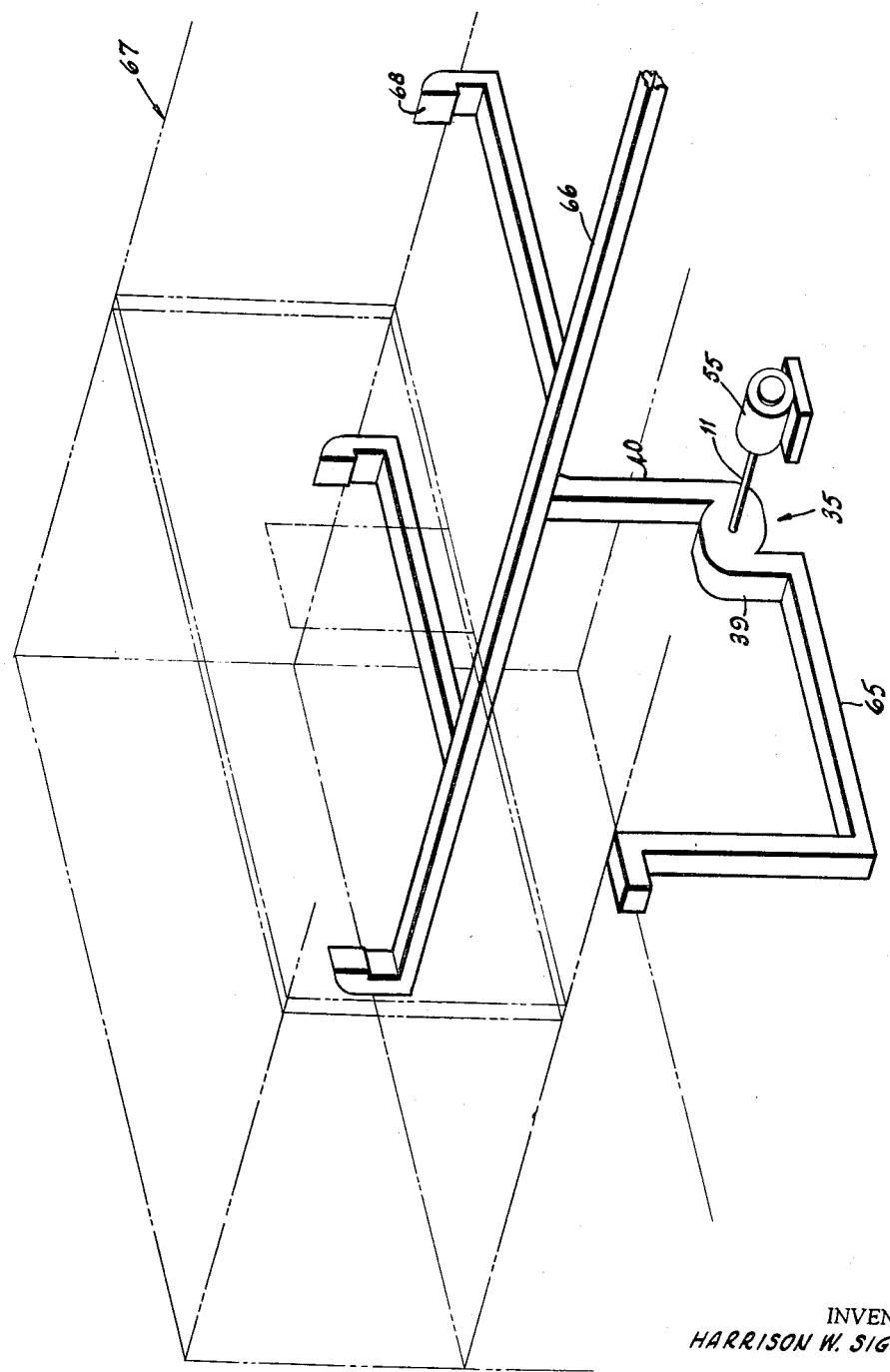
Figure 12 is a diagrammatic view showing the pump of the invention installed as part of a heating and cooling system for a dwelling.

Referring now to Figure 12, a system is there shown including a centrifugal type heat pump 35 driven by a motor 55 and having tangential outlet vents 39 and 40. One of the outlet ducts, for example, that shown at 39 connects to a duct 65 which discharges to the atmosphere. The other duct 40 connects to a system of ducts indicated generally by the reference numeral 66 which may be located beneath the floor of a dwelling such as shown at 67 and which terminate in outlets or registers 68.

It will be apparent that in operation the motor 55 will be operated continuously. Suitable thermostatic means will be provided such as that shown in Figure 10, whereby warm air or cold air is delivered to the ducting 66 through the tangential vent 40 and cold or warm air is discharged to the outside through the tangential duct 39 and the duct 65, depending upon the prevailing temperature. Thus, it will be apparent that a temperature control system is provided which is operable in both winter and summer to heat or cool a house as required by circumstances and that a continuous hour-to-hour control is effected over such temperature system.

As stated above, the apparatus of the invention may be employed as a heat engine. Referring to Figure 3, which will serve for the purpose of illustration, the shaft 11 is a power take-off shaft rather than a driving shaft. The blower 28 blows a cool gas (e.g., air at atmospheric temperature) and the blower 29 blows a hot gas (e.g., hot air from a heater) into opposite compartments of the apparatus. The hot air blown into the right-hand compartment (as viewed in Figure 4) will expand the gas in the bellows 16 in that compartment and the cold air blown into the left-hand compartment will cause a reduction in volume of the gas in the bellows in that compartment. The simultaneous expansion of one half and compression of the other half of the bellows will induce rotation of the system, hence of shafts 11 and 12. Power can be derived from the shaft 11.

The shaft 13 will be adjusted to give optimum results under the particular circumstances which prevail. Thus, if the shaft 13 is shifted to increase the angle θ, the bellows members 16 will expand more on the expansion side of the baffle 20 and will contract more on the contraction side. Hence the bellows members 16 will be able to absorb more heat on the expansion side. If a plentiful source of heat is available it may be desirable to increase the angle θ to extract as much heat as possible.

It will, therefore, be apparent that a device has been provided which is capable of acting as a heat pump (to convert mechanical energy into thermal energy) or as a heat engine (to convert thermal energy into mechanical energy). The device has several important advantages among which may be mentioned adjustability and the fact that the expansion-contraction members are not required to carry a mechanical load. The device is versatile, being adapted to blower-type and centrifugal type systems; to cooling and/or heating systems; to automatic control; and to employment for conversion of thermal or mechanical energy.

I claim:

1. Apparatus of the character described comprising a first shaft rotatable about a fixed axis, a second shaft rotatable about a variable axis intersecting the fixed axis, universal means establishing a driving connection between said shafts, a plurality of expansible-contractible members each fixed at one end to one of said shafts to rotate therewith and at its other end to the other of said shafts to rotate therewith, each said expansible-contractible member having a half cycle of expansion and a half cycle of contraction during each revolution of said shafts and acting to generate heat during one such half cycle and to cool and absorb heat during the other half cycle, and housing and baffle means forming two chambers, each having an inlet for ingress of gas and an outlet for egress of gas, one of said chambers providing a confined, isolated space which, at each instant of operation, includes all of the expansible-contractible members in the expansion phase of their cycle, the other of said chambers providing a confined, isolated space which, at each instant of operation, includes all of the expansible-contractible members in the contraction phase of their cycle.

2. Apparatus of the character described comprising a first shaft rotatable about a fixed axis, a second shaft rotatable about a variable axis intersecting the fixed axis, universal means establishing a driving connection between said shafts, a plurality of expansible-contractible gas chambers each fixed at one end to one of said shafts to rotate therewith and at its other end to the other of said shafts to rotate therewith and housing and baffle means forming two chambers, each having an inlet for ingress of gas and an outlet for egress of gas, one of said chambers providing a confined, isolated space which, at each instant of operation, includes all of the expansible-contractible gas chambers in the expansion phase of their cycle, the other of said chambers providing a confined, isolated space which, at each instant of operation, includes all of said expansible-contractible gas chambers during the contraction phase of their cycle.

3. Apparatus of the character described comprising a fixed shaft, a variable shaft whose axis intersects the axis of the fixed shaft and universal means establishing a driving connection therebetween; said apparatus also comprising a first end plate fixed to the fixed shaft to rotate therewith, a second end plate fixed to the variable shaft to rotate therewith, a plurality of expansible-contractible members each fixed at one end to said first plate and at its other end to said second plate such that each of said members undergoes expansion during half of each revolution of said shafts and contraction during the other half of each such revolution, said expansible-contractible members having the property of generating heat during one phase and absorbing heat during the other phase of their expansion-contraction cycle; said apparatus also comprising baffle means mounted on said shafts and adapted to maintain a substantially vertical position, said pump also having a housing, said baffle means and housing together providing a pair of chambers disposed on opposite sides of said baffle means, one of said chambers including, at each instant of operation, all of the expansible-contractible members in the expansion phase of their cycle, the other chamber including all of those expansible-contractible members in the contraction phase of their cycle, said housing being formed with inlet means for ingress of a gas into and outlet means for egress of gas out of each chamber, the inlet and outlet of each such chamber being so arranged that the current of gas passing from the inlet to the outlet contacts and undergoes heat exchange with the expansible-contractible members.

4. Apparatus of the character described comprising a fixed shaft, a variable shaft whose axis intersects the axis of the fixed shaft and universal means establishing a driving connection therebetween; said apparatus also comprising a first end plate fixed to the fixed shaft to rotate therewith, a second end plate fixed to the variable shaft to rotate therewith, a plurality of expansible-contractible gas chambers each fixed at one end to said first plate and at its other end to said second plate, such that each of said chambers undergoes expansion during half of each revolution of said shafts and contraction during the other half of each such revolution; said apparatus also comprising baffle means mounted on said shafts and adapted to maintain a substantially vertical position, and a housing, said baffle means and housing together providing a pair of compartments disposed on opposite sides of said baffle means, one of said compartments including, at each instant of operation, all of the chambers in the expansion phase of their cycle, the other compartment including all of those chambers in the contraction phase of their cycle, said housing being formed with inlet means for ingress of a gas into and outlet means for egress of gas out of each compartment, the inlet and outlet of each such compartment being so arranged that the current of gas passing from the inlet to the outlet contacts and undergoes heat exchange with the chambers.

5. A blower type system of the character described comprising a fixed shaft, a variable shaft whose axis intersects the axis of the fixed shaft, means establishing a driving connection between said shafts to permit variation of the angle between the shafts, a plurality of expansible-contractible members capable of producing heat during one phase and absorbing heat during the other phase of their cycle of operation, baffle means loosely supported on said shafts to divide the apparatus into two halves and a stationary but expansible-contractible housing cooperating with said baffle to form two compartments in one of which said members are in the expansion phase of their cycle and in the other of which said members are in the compression phase of their cycle; said system also comprising blower means for blowing separate streams of air into said compartments, and a separate outlet means for each compartment.

6. A centrifugal type system of the character described comprising a fixed shaft, a variable shaft whose axis intersects the axis of the fixed shaft, means establishing a driving connection between said shafts, a plate formed with inlet ports and fixed to each shaft to rotate therewith, a plurality of expansible-contractible gas chambers each fixed at one end to one of said plates and at its other end to the other of said plates, each said chamber producing heat during one half of its cycle of operation and absorbing heat during the other half of its cycle and also acting as a vane or impeller to suck in air through said ports, and a stationary housing of expansible-contractible construction enclosing said chambers, said housing having a tangential outlet vent on each side for venting heated air and cooled air.

7. A temperature control-heat transfer system comprising a heat pump in the form of a pair of shafts disposed at an angle with respect to one another and at least one expansible-contractible member capable of generating heat during one phase of its expansion-contraction cycle and of absorbing heat during the other phase thereof, said member being fixed at one end to one of said shafts to rotate therewith and at its other end to the other of said shafts to rotate therewith, whereby during one-half of each revolution of said shafts, said member undergoes expansion and during the other half undergoes contraction, said system also comprising means mounting one of said shafts to vary the angle between the two shafts, and thermostatic means for so varying said angle to control heat exchange accomplished by the system in response to varying ambient temperature.

References Cited in the file of this patent

UNITED STATES PATENTS

| | | |
|---|---|---|
| 1,352,019 | Murphy | Sept. 7, 1920 |
| 1,381,155 | Wood | June 14, 1921 |
| 1,469,729 | Myers | Oct. 2, 1923 |
| 2,255,943 | Sarver | Sept. 16, 1941 |
| 2,722,812 | Golasky | Nov. 8, 1955 |
| 2,814,935 | Sigworth | Dec. 3, 1957 |